United States Patent
Hori et al.

[11] Patent Number: 5,840,811
[45] Date of Patent: Nov. 24, 1998

[54] OPTICALLY ACTIVE BLOCK POLYESTER COPOLYMER AND METHOD FOR PRODUCTION THEREOF

[75] Inventors: Yoji Hori; Tohru Kobayashi; Hideyuki Hongo; Akio Yamaguchi; Yoko Takahashi; Takashi Imai; Toshimitsu Hagiwara, all of Kanagawa, Japan

[73] Assignee: Takasago International Corporation, Tokyo, Japan

[21] Appl. No.: 786,253

[22] Filed: Jan. 22, 1997

Related U.S. Application Data

[63] Continuation of Ser. No. 470,118, Jun. 6, 1995, abandoned.

[30] Foreign Application Priority Data

Jun. 8, 1994 [JP] Japan ..................................... 6-148725
Dec. 13, 1994 [JP] Japan ..................................... 6-332198

[51] Int. Cl.⁶ .......................... C08G 63/08; C08G 63/85
[52] U.S. Cl. ......................... 525/411; 525/415; 528/357; 528/359
[58] Field of Search .................................. 528/415, 411, 528/357, 359

[56] References Cited

U.S. PATENT DOCUMENTS

| | | | |
|---|---|---|---|
| 5,124,371 | 6/1992 | Tokiwa | 525/415 |
| 5,430,125 | 7/1995 | Hori | 528/354 |
| 5,439,985 | 8/1995 | Gross | 525/411 |
| 5,440,007 | 8/1995 | Gross | 528/354 |

FOREIGN PATENT DOCUMENTS 601885 6/1994 European Pat. Off. ............... 528/357

*Primary Examiner*—Patricia A. Short
*Attorney, Agent, or Firm*—Sughrue, Mion, Zinn, Macpeak & Seas, PLLC

[57] ABSTRACT

An optically active block polyester copolymer formed of structural units represented by the following general formulas (I) and (II):

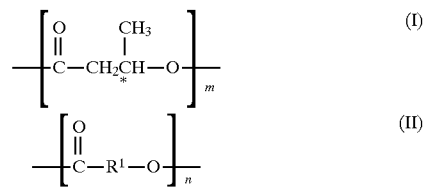

wherein $\overset{C}{*}$ represents for an asymmetric carbon atom and m and n each represents a natural number in the range of from 300 to 5000 is obtained by subjecting an optically active butyrolactone and a species of lactone other than the optically active butyrolactone to sequential ringopening copolymerization in the presence of a catalyst. This optically active block polyester copolymer possesses a high molecular weight and a high melting point (not less than 130° C.) and forms a biodegradable and hydrolyzable material of high strength capable of tolerating the impacts of actual use.

8 Claims, 4 Drawing Sheets

OPTICALLY ACTIVE BLOCK POLYESTER COPOLYMER AND METHOD FOR PRODUCTION THEREOF

This is a Continuation of application Ser. No. 08/470,118 filed Jun. 6, 1995, now abandoned.

BACKGROUND OF THE INVENTION

1. Field of the Invention

This invention relates to an optically active block polyester copolymer and a method for the production thereof.

2. Description of the Prior Art

In recent years, since sparingly decomposable films and fishing lines which are discarded at random have been aggravating the issue of environmental pollution, plastic materials which are easily decomposed by microorganisms living in the natural world are earnestly longed for. Further, such plastic materials as possess biocompatibility and succumb to in vivo decomposition and absorption are desired to be capable of retaining strength while the texture is undergoing regeneration and quickly vanishing after the regeneration is completed.

Aliphatic polyesters have been recognized as biodegradable and biocompatible compounds. Among aliphatic polyesters, poly[(R)-3-hydroxybutyric acid] (hereinafter referred to briefly as "P[(R)-3HB]") which microorganisms accumulate in their cells has been attracting attention as a thermoplastic resin having a high melting point (about 180° C.) ("Biodegradable Macromolecular Materials," p. 21, written by Yoshiharu Doi and published in 1990 by Industrial Investigation Society). It has been also known that numerous species of microorganisms are capable of accumulating various poly[(R)-3-hydroxyalkanoic acids] (hereinafter referred to briefly as "P[(R)-3HA]") ("Biodegradable Macromolecular Materials," p. 21, written by Yoshiharu Doi and published in 1990 by Industrial Investigation Society). As products endowed with improved properties of P[(R)-3HB], the copolymer of (R)-3-hydroxybutyric acid with (R)-3-hydroxyvaleric acid (hereinafter referred to briefly as "P[(R)-3HB-co-(R)-3HV]") has been reported by P. A. Holmes (*Phys. Technol.*, 1985, (16), p. 32) and the copolymer of (R)-3-hydroxybutyric acid with 4-hydroxybutyric acid (hereinafter referred to briefly as "P[(R)-3HB-co-4HB]") has been reported by Doi et al. (*Polym. Commun.* 29, 174 (1988)). These copolymers are random copolymers (*Macromolecules*, 1986, (19), 2860; *Macromolecules*, 1988, (21), 2722).

Recently, various macromolecular biodegradable random polyester copolymers having (R)-3-hydroxybutyric acid units have been chemically synthesized by ring-opening copolymerization of (R)-butyrolactone (hereinafter referred to briefly as "(R)-BL") with various lactones in the presence of a distannoxane catalyst (*Macromolecules*, 1993, (26), 4388).

By synthesizing a random copolymer as described above, the degree of crystallization of a polyester can be lowered and the property of brittleness can be improved. A random copolymer, however, generally forms a cause for lowering the melting point of the polyester. For the purpose of synthesizing an aliphatic polyester possessing biodegradability and showing a melting point of not less than 100° C., the macromolecular compound must contain an optically active 3-hydroxy butyric acid unit and an optically active L-lactic acid unit or glycolic acid unit in a major proportion. This fact entrains a commercially serious problem of increasing the cost of production. Further, with a random copolymer, it is relatively difficult to obtain soft film or rubber while keeping high melting point and high strength intact.

For the solution of this problem, the idea of synthesizing a block polyester copolymer may be conceived. M. S. Reeve et al. have obtained the block polyester copolymer of P[(R)-3HB] with poly-ε-caprolactone (hereinafter referred to briefly as "P[(R)-3HB]-PCL"), the block polyester copolymer of P[(R)-3HB] with poly-L-lactide (hereinafter referred to briefly as "P[(R)-3HB]-P-(L-LA)"), and the block polyester copolymer of P[(R)-3HB] with poly-DL-lactide (hereinafter referred to as "P[(R)-3HB]-P(DL-LA)") by subjecting a microorganically produced P[(R)-3HB] to permethanolysis thereby producing an oligomer, then causing triethyl aluminum to react with the terminal hydroxyl group of the oligomer, and having the reaction product as a polymerization initiator react with ε-caprolactone (hereinafter referred to briefly as "CL"), L-lactide (hereinafter referred to briefly as "L-LA"), or DL-lactide (hereinafter referred to briefly as "DL-LA") (*Macromolecules*, 1993, (26), 888).

The P[(R)-3HB]-PCL which is obtained by the reaction of a microorganically produced P[(R)-3HB] with CL in the presence of a catalyst such as methanesulfonic acid, for example, is disclosed in JP-A-04-153215. The block polyester copolymer of racemiform butyrolactone (hereinafter referred to briefly as "BL") with CL (hereinafter referred to briefly as "P(3HB)-PCL") and the block polyester copolymer of BL with β-propiolactone (hereinafter referred to briefly as "PL") both produced in the presence of a diethyl zinc/water catalyst are disclosed in JP-A-05-320323. Further, the block polyester copolymer of BL with PL produced in the presence of an aluminum porphyrin catalyst or a crown ether and a potassium metal catalyst is reported (*Macromolecules*, 1984, (17), 2217 and *Makromol. Chem.*, 1987 (188), 1575).

As a material for gradual release of chemicals, the block polyester copolymer of L-LA or DL-LA with CL (hereinafter referred to briefly as "P(L-LA)-PCL" or "P(DL-LA)-PCL") is reported (*J. Polym. Sci.: Polym. Lett. Ed.*, 1983, (21), 593, *Macromolecules*, 1991, (24), 3027, *Polym. Bull.*, 1993 (31), 9, and *Macromolecules*, 1991, (24), 3027).

The block copolymerization of a lactone with another lactone must rely on the method of living polymerization. To be specific, when the first lactone is subjected to ring-opening polymerization in the presence of a catalyst, the polymer assumes an active state having the terminal thereof linked to the catalyst. When the other lactone is added to the polymerization system, it induces gradual insertion reaction between the polymer terminal and, the catalyst and consequent elongation of the polymer chain. Otherwise, the block polyester copolymer cannot be synthesized.

With any of the catalysts used in the reports cited above, therefore, macromolecular block polyester copolymers between different species of lactones selected from a wide range have never been obtained. According to the report made by M. S. Reeve et al. (*Macromolecules*, 1993, (26), 888), for example, the block polyesters produced by them have high melting points of from 135° to 151° C. and yet shows number-average molecular weights of not more than 10,000. These block polyesters by themselves cannot serve as materials with high strength.

The P[(R)-3HB]-PCL disclosed in JP-A-04-153215 is designated as a "block polyester copolymer. It is, however, thought rather to be a mere blend of P[(R)3HB] with PCL and not to be a block polyester copolymer (as may be remarked from Comparative Example 1 to be described hereinbelow). The fact that the polyester disclosed in the patent specification has a weight average molecular-weight of not more than 71,000 and barely serves as a very brittle material clearly suggests that it is not a copolymer but is rather a blend.

The P(3HB)-PCL which is disclosed in JP-A-05-320323 has a relatively high number-average molecular weight of about 205,000. Since BL, which is one of the raw materials (comonomers) to be used therefor, is a racemic compound, the produced P(3HB)-PCL has a melting point short of 100° C. This is an insufficient melting point for any of the polyesters which are generally usable. Further, since the BL is a racemic compound, the produced P(3HB)-PCL has a rubbery form and does not form a hard crystalline material.

SUMMARY OF THE INVENTION

An object of this invention, therefore, is to provide a novel optically active block polyester copolymer excelling in biodegradability and hydrolyzability, possessing a high molecular weight and a melting point sufficiently high to tolerate the conditions of practical use, and serving as a material of high strength and a commercially advantageous method for the production of the polyester.

The present inventors have made a diligent study with a view to solving the problems attendant on the prior art as described above. As a result of this study, they have found that when an (R)-form or (S)-form optically active β-butyrolactone and a lactone other than the optically active β-butyrolactone are gradually introduced into a reaction system in the presence of a tin catalyst, these lactones readily undergo a ring-opening polymerization and produce a corresponding optically active block polyester copolymer. This invention has been perfected as a result.

Specifically, this invention provides an optically active block polyester copolymer formed of structural units represented by the following general formulas (I) and (II):

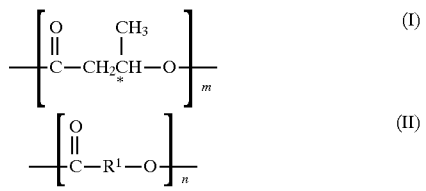

wherein $\overset{C}{*}$ represents an asymmetric carbon atom, $R^1$ represents a member selected from the group consisting of —$(CH_2)_x$—, —$CH_2CH(CH_3)$—, —$CH_2CH$ $(C_2H_5)$—, —$CH(CH_3)CH(CH_3)$—, —$C(CH_3)_2CH_2$—, —$CH(CH_3)$ $CH_2CH_2$—, —$CH_2CH(CH_3)CH_2$—, —$CH_2CH_2CH$ $(CH_3)$—, —$CH_2CH(CH_3)CH_2CH_2$—, —$CH(CH_3)OCOCH$ $(CH_3)$—, —$CH_2OCOCH_2$—, —$CH_2CH(CH_3)$ $OCH_2CH_2$—, —$(CH_2)_7CH=CH(CH_2)_6$—, $(CH_2)_{10}O$ $(CH_2)_4$—, —$(CH_2)_9O(CH_2)$— and —$(CH_2)_8O(CH_2)_6$—, x represents a natural number in the range of from 2 to 15, and m and n each represent a natural number in the range of from 300 to 5000).

This invention also provides a method for the production of the aforementioned optically active block polyester copolymer, comprising subjecting an optically active butyrolactone and a lactone other than the optically active butyrolactone mentioned above to gradual ring-opening copolymerization in the presence of a catalyst.

This invention will be better understood and the objects, features, and advantages thereof other than those set forth above will become apparent when consideration is given to the following detailed description thereof, which makes reference to the annexed drawings.

DETAILED DESCRIPTION OF PREFERRED EMBODIMENTS

Figure 1:
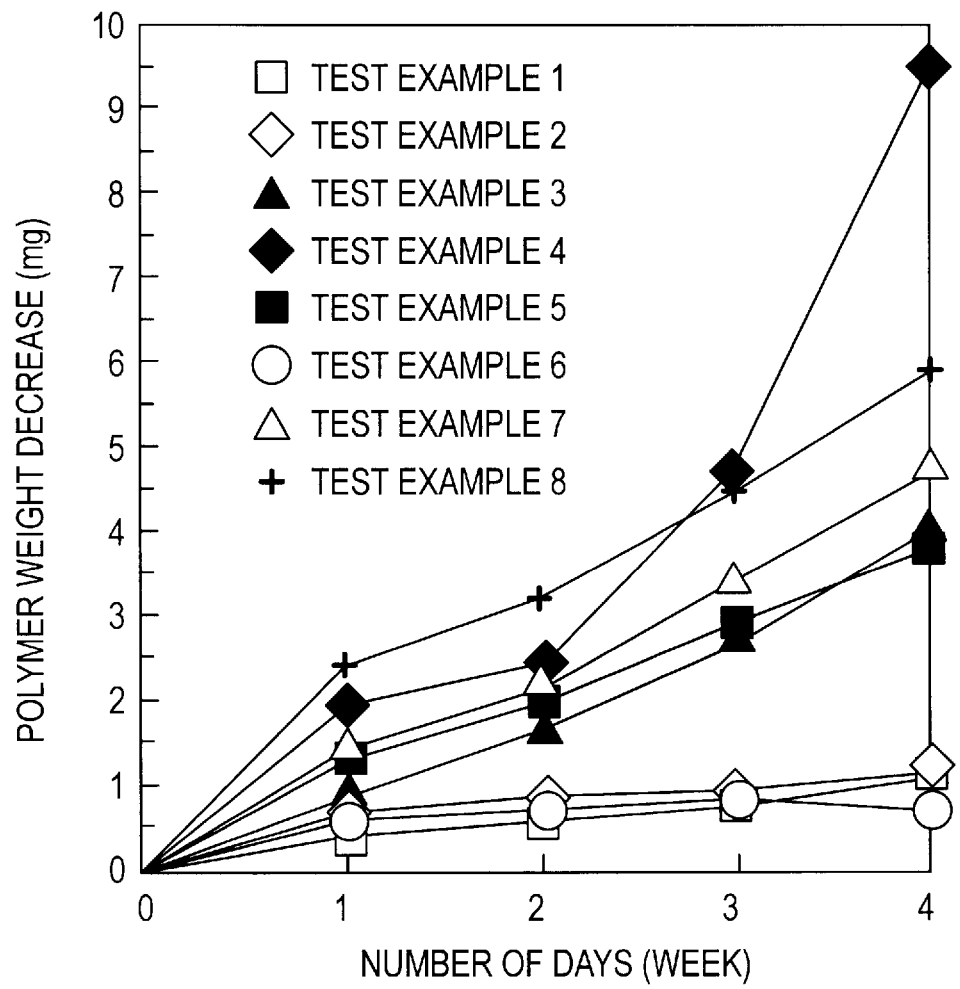
FIG. 1 is a graph showing the results of a test performed on polymers in test examples for biodegradability, specifically with respect to the relation between the number of days and the decreases in the weights of the polymers.

Now, this invention will be described more specifically below.

The block type polyester copolymer of this invention comprises the structural units (I) and (II) mentioned above. The polyester may contain other comonomer in a small proportion. The symbols m and n which indicate the numbers of the structural units (I) and (II) each represent a number in the range of from 300 to 10000. When the lactones to be used have rings of not more than seven members having relatively small molecular weights, however, the symbols each represent a natural number in the range of from 400 to 6000.

The optically active block polyester copolymer of this invention is desired to be such that the molar ratio of the structural unit (I) to the structural unit (II) is in the range of 10–90:90–10 and the weight-average molecular weights (hereinafter occasionally referred to as "Mw") are in the range of from 60000 to 2000000, preferably from 75000 to 1200000.

The optically active (R)-β-butyrolactone and the (S)-β-butyrolactone which are the raw materials for the optically active block polyester copolymer of this invention can be easily obtained, for example, by the method the present inventors have disclosed in JP-A-04-210683 and JP-A-05-345867, namely by subjecting a diketene to asymmetric hydrogenation in the presence of a ruthenium optically active phosphine complex as a catalyst.

The lactone which constitutes itself the structural unit (II), i.e., one of the raw materials for the block polyester copolymer of this invention will be explained.

First, the optically active (R)-β-valerolactone and the (S)-β-valerolactone can be obtained, for example, by the method proposed by Y. Zhang et al., namely through four steps of process from 3-hydroxyvalerate (*Macromolecules*, 1990, (23), 3206). Then, the optically active (R)-7-methyl-1,4-dioxepan-5-one and the (S)-7-methyl-1,4-dioxepan-5-one can be obtained, for example, by the method the present inventors have disclosed in JP-A-04-316757, namely through a three step process from an optically active methyl 3-hydroxybutyrate.

The α,α-dimethyl-β-propiolactone can be obtained, for example, by the method disclosed in Yamashita, Y., Ishikawa, Y., and Tsuda, T.: "Kogyo Kagaku Zasshi 1964," 67,252 and the α,β-dimethyl-β-propiolactone, for example, by the method disclosed by Dervan, P. B. and Jones, C. R.: J. Org. Chem., 1979, 44,2116.

As specific examples of the other lactone which is usable herein, β-butyrolactone, β-propiolactone, α-methyl-β-propiolactone, β-ethyl-β-propiolactone, γ-butyrolactone, α-methyl-β-butyrolactone, β-methyl-γ-butyrolactone, α-methyl-γ-butyrolactone, glycolide, L-lactide, DL-lactide, δ-valerolactone, β-methyl-δ-valerolactone, ε-caprolactone, 15-pentadecanolide, 16-hexadecanolide, 9-hexadecene-16-olide, 12-oxa-16-hexadecanolide, 11-oxa-16-hexadecanolide and 10-oxa-16-hexadecanolide may be cited.

The lactones mentioned above are either commercially available or synthetically obtainable. They are desired to be purified by undergoing twice a procedure of distillation from a solution containing calcium hydride and then kept stored in an inert gas until actual use.

For the polyester of this invention, the lactones mentioned above are used in the form of a racemate or optically active compounds. Two or more of these lactones, if desired, may be used in combination.

The amounts of the lactones to be subjected to the block copolymerization in this invention are desired to be such that the molar ratio of the structural unit (I) to the structural unit (II) falls in the range of 10–90:90–10 as mentioned above. The molar ratio is more desirably in the range of 20–80:80–20 and most desirably in the range of 30–70:70–30.

The block copolymerization in this invention is implemented specifically by placing an optically active β-butyrolactone in a reaction vessel containing either an inert solvent or no solvent and filled with an inert gas such as nitrogen or argon, adding to the reaction vessel a catalyst which will be described specifically hereinbelow, and causing the lactone to react under normal pressure at a temperature in the range of from 60° to 180° C. for a period in the range of from 30 minutes to five hours to complete the first stage of polymerization, adding a small amount of an inert solvent to the resultant reaction solution thereby lowering the viscosity thereof, then adding a lactone different from the optically active butyrolactone used in the first stage and causing this lactone to react with the polymer of the first stage for a period in the range of from one to 48 hours to complete the second stage of reaction. As a result, an AB type block copolymer can be obtained.

The copolymerization is otherwise implemented by a method which comprises polymerizing various species of lactones in the first stage and adding an optically active butyrolactone to the resultant polymer of the first stage thereby obtaining a BA type block copolymer in the second stage. Further, the block copolymerizations of the ABA type, ABC type, etc., are effected by causing an optically active butyrolactone or other lactone to react with the AB type block copolymer by following the procedure of the second stage.

As specific examples of the tin type catalyst to be used effectively in the polymerization reaction, dibutyltin oxide, dioctyltin oxide, tin dioctylate, and dibutyl tin laurate may be cited. The distannoxane catalysts represented by the following general formula (III):

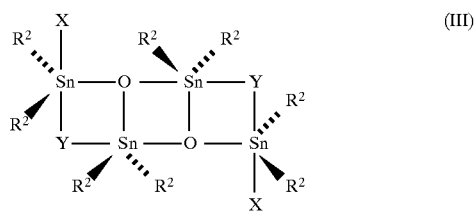

(wherein $R^2$ represents an alkyl group having from one to 12 carbon atoms or a phenyl group, X represents a member selected from the group consisting of Cl, Br, and NCS, and Y represents a member selected from the group consisting of Cl, Br, NCS, OH, an alkoxy group having from one to four carbon atoms, and a phenoxy group). As specific examples of the distannoxane catalyst of the general formula (III) mentioned above, 1,3-dichlorotetrabutyl distannoxane, 1,3-dichlorotetraphenyl distannoxane, 1,3-dichlorotetraoctyl-distannoxane, 1,3-dichlorotetradodecyl distannoxane, 1,3-dibromotetrabutyl distannoxane, 1-hydroxy-3-chlorotetrabutyl distannoxane, 1-hydroxy-3-chlorotetraoctyl distannoxane, 1-hydroxy-3-chlorotetradodecyl distannoxane, 1-hydroxy-3-bromotetrabutyl distannoxane, 1-methoxy-3-chlorotetrabutyl distannoxane, 1-methoxy-3-chlorotetraoctyl distannoxane, 1-ethoxy-3-chlorotetrabutyl distannoxane, 1-ethoxy-3-chlorotetraoctyl distannoxane, 1-ethoxy-3-chlorotetradodecyl distannoxane, 1-phenoxy-3-chlorotetrabutyl distannoxane, 1-methoxy-3-bromotetrabutyl distannoxane, 1-ethoxy-3-bromotetrabutyl distannoxane, 1-phenoxy-3-bromotetrabutyl distannoxane, 1-hydroxy-3-(isothiocyanato)tetrabutyl distannoxane, 1-hydroxy-3-(isothiocyanato)tetraoctyl distannoxane, 1-hydroxy-3-(isothiocyanato)tetradodecyl distannoxane, 1-methoxy-3-(isothiocyanato)tetrabutyl distannoxane, 1-ethoxy-3-(isothiocyanato)tetrabutyl distannoxane, 1-methoxy-3-(isothiocyanato)tetraoctyl distannoxane, 1-ethoxy-3-(isothiocyanato)tetraoctyl distannoxane, 1-ethoxy-3-(isothiocyanato)tetradodecyl distannoxane, 1-phenoxy-3-(isothiocyanato)tetrabutyl distannoxane, 1,3-bis(isothiocyanato)tetrabutyl distannoxane, 1,3-bis(isothiocyanato)tetramethyl distannoxane, 1,3-bis(isothiocyanato)tetraoctyl distannoxane, and 1,3-bis(isothiocyanato)tetradodecyl distannoxane may be cited.

These catalysts can be easily synthesized; 1,3-dichlorotetraphenyl distannoxane, as described in J. Organomet. Chem. 3, p. 70 (1965), and 1-hydroxy-3-(isothiocyanato)tetrabutyl distannoxane, as described in J. Org. Chem. 56, P.5307, (1991), by causing dibutyltin oxide to react with dibutyltin diisothiocyanate in ethanol.

In this invention, these catalysts may be used either singly or in the form of a mixture of two or more members to suit occasion.

The amount of the catalyst to be added to the monomers as the raw materials is in the range of from 1/500 to 1/40000 mol, preferably 1/1000 to 1/20000 mol, per mol of the monomers.

The solvent which may be used in this invention does not need to be particularly limited but may be any of the solvents which are generally used in the ring-opening polymerization. As concrete examples of the solvent, linear or cyclic ethers such as diisopropyl ether, tetrahydrofuran, and 1,4-dioxane, organic halogenides such as methylene bromide and dichloroethane, aromatic compounds such as toluene, benzene, and xylene, and mixtures thereof may be cited.

These solvents are commercially available. They are desired to be refined, for example, by distillation from a solution containing metallic sodium and benzophenone in the presence of an inert gas and then kept stored in an inert gas until actual use.

Now, this invention will be described more specifically below with reference to working examples and test examples. It should be noted, however, that this invention is not to be construed as being limited to these working examples and test examples. Unless otherwise indicated herein, all parts, percents, ratios and the like are by weight.

The analytical devices used in the working examples and the test examples and the devices used in the test for biodegradability are as follows.

1) Nuclear magnetic resonance spectrum (NMR): AM400 type device (400 MHZ) (produced by Bruker Corp.)
2) Molecular weight: D2520 GPC Integrator (produced by Hitachi, Ltd.)
3) Heat quantity: Differential scanning calorimeter (DSC) DSC50 (produced by Shimadzu Seisakusho Ltd.)
4) Thermogravimetric analysis: Thermogravimetric analyzer, TGA50 (produced by Shimadzu Seisakusho Ltd.)
5) Specific rotation: Digital optical rotatory meter, DIP360 type (produced by Nippon Bunko Kogyo K.K.)
6) Test for biodegradability: Activated sludge (procured from Chemical Product Testing Association on Jan. 20, 1994)

Various tests were carried out in accordance with the specifications on the microorganic test of chemical substances for degree of decomposition described in "Methods for Test of Novel Chemical Substances" ("BIODEGRADATION STUDIES" specified in Kanpogyo: Bureau certified No. 5, Yakuho: Bureau certified No. 615, 49 Kikyoku: Bureau certified No. 392, July 13,1974; revised on Mar. 31, 1987) and the contents of Y. Doi, A. Segawa, and M. Kunioka, *Int. J. Biol. Macromol.,* 1990, Vol. 12, April, 106 by the use of the devices mentioned above.

The data obtained in the following working examples and the comparative examples concerning the synthesis of block polyester copolymer, specifically the ratio of monomers charged (molar ratio except for the amount of monomers compounded (g) in Comparative Example 1), ratio of monomer contents in block polyester copolymer, weight-average molecular weight (Mw), number-average molecular weight (Mn), glass transition point (Tg), melting point (Tm), decomposition temperature (Td), and specific rotatory power ($[\alpha]_D^{23}$) are collectively shown in Table 1.

EXAMPLE 1

Synthesis of AB type block polyester (hereinafter referred to briefly as "P[(R)-3HB]-PCL") by sequential ring-opening copolymerization of (R)-β-butyrolactone (hereinafter referred to briefly as "(R)-BL") and ε-caprolactone (hereinafter referred to briefly as "CL")

In a reaction vessel having an inner volume of 20 ml, 1.72 g (20 mmol) of (R)-BL, 2.0 ml of toluene, and 5.6 mg (0.005 mmol) of 1-ethoxy-3-chlorotetrabutyl distannoxane were placed and stirred at 100° C. for 5.5 hours under argon (hereinafter referred to briefly as "Ar"). In the reaction solution, 2.0 ml of toluene added thereto and 2.28 g (20 mmol) of CL added thereto immediately thereafter were left reacting for 1.5 hours. By dissolving the product of the reaction in chloroform and throwing the resultant solution into a 1:3 mixed solution of diethyl ether and hexane thereby inducing reprecipitation, there was obtained 3.74 g (yield 93.5%) of the captioned block polymer.

EXAMPLE 2

Synthesis of P[(R)-3HB]-PCL by sequential ring-opening copolymerization of (R)-BL and CL In a reaction vessel having an inner volume of 30 ml, 3.44 g (40 mmol) of (R)-BL and 12.0 mg (0.01 mmol) of 1-ethoxy-3-chlorotetrabutyl distannoxane were placed and stirred at 100° C. for three hours under Ar. In the reaction solution, 0.5 ml of toluene added thereto and 4.57 g (40 mmol) of CL added thereto immediately thereafter were left reacting for one hour. By dissolving the product of the reaction in chloroform and throwing the resultant solution into a 1:3 mixed solution of diethyl ether and hexane thereby inducing reprecipitation, there was obtained 4.57 g (yield 55.2%) of the captioned block polymer.

EXAMPLE 3

Synthesis of P[(R)-3HB]-PCL by sequential ring-opening copolymerization of (R)-BL and CL In a reaction vessel having an inner volume of 30 ml, 3.57 g (41.5 mmol) of (R)-BL and 0.0214 mg (0.021 mmol) of 1-thioisocyanato-3-hydroxytetrabutyl distannoxane were placed and stirred at 100° C. for 1.5 hours under Ar. In the reaction solution, 0.5 ml of toluene was added and left reacting for 0.5 hour and 4.78 g (41.9 mmol) of CL was added and left reacting for one hour. By dissolving the product of the reaction in chloroform and throwing the resultant solution into a 1:3 mixed solution of diethyl ether and hexane thereby inducing reprecipitation, there was obtained 7.22 g (yield 86.5%) of the captioned block polymer.

EXAMPLE 4

Synthesis of P[(R)-3HB]-PCL by sequential ring-opening copolymerization of (R)-BL and CL In a reaction vessel having an inner volume of 30 ml, 3.54 g (41.1 mmol) of (R)-BL and 22.4 mg (0.021 mmol) of 1-chloro-3-hydroxytetrabutyl distannoxane were placed and stirred at 100 for 1.5 hours under Ar. In the reaction solution, 0.5 ml of toluene was added and left reacting for 0.5 hour and 4.67 g (40.9 mmol) of CL was added and left reacting for 1.5 hours. By dissolving the product of the reaction in chloroform and throwing the resultant solution into a 1:3 mixed solution of diethyl ether and hexane thereby inducing reprecipitation, there was obtained 5.18 g (yield 63.1%) of the captioned block polymer.

EXAMPLE 5

Synthesis of P[(R)-3HB]-PCL by sequential ring-opening copolymerization of (R)-BL and CL In a reaction vessel having an inner volume of 20 ml, 1.72 g (20 mmol) of (R)-BL, 2.0 ml of toluene, and 7.9 mg (0.005 mmol) of 1-ethoxy-3-chlorotetrabutyl distannoxane were placed and stirred at 100° C. for 3 hours under Ar. In the reaction solution, 4.0 ml of toluene added thereto and 4.57 g (40 mmol) of CL added thereto immediately thereafter were left reacting for one hour. By dissolving the product of the reaction in chloroform and throwing the resultant solution into a 1:3 mixed solution of diethyl ether and hexane thereby inducing reprecipitation, there was obtained 5.95 g (yield 94.6%) of the captioned block polymer.

EXAMPLE 6

Synthesis of P[(R)-3HB]-PCL by sequential ring-opening copolymerization of (R)-BL and CL In a reaction vessel having an inner volume of 20 ml, 2.58 g (30 mmol) of (R)BL, 3.0 ml of toluene, and 8.4 mg (0.0075 mmol) of 1-ethoxy-3-chlorotetrabutyl distannoxane were placed and stirred at 100° C. for 3 hours under Ar. In the reaction solution, 1.5 ml of toluene added thereto and 1.71 g (15 mmol) of CL added thereto immediately thereafter were left reacting for one hour. By dissolving the product of the reaction in chloroform and throwing the resultant solution into a 1:3 mixed solution of diethyl ether and hexane thereby inducing reprecipitation, there was obtained 3.55 g (yield 82.7%) of the captioned block polymer.

EXAMPLE 7

Synthesis of P[(R)-3HB]-PCL by sequential ring-opening copolymerization of (R)-BL and CL In a reaction vessel having an inner volume of 20 ml, 1.72 g (20 mmol) of (R)-BL, 2.0 ml of toluene, and 5.6 mg (0.005 mmol) of 1-ethoxy-3-chlorotetraoctyl distannoxane were placed and stirred at 100° C. for 3 hours under Ar. In the reaction solution, 2.0 ml of toluene added thereto and 2.29 g (20 mmol) of CL added thereto immediately thereafter were left reacting for one hour. By dissolving the product of the reaction in chloroform and throwing the resultant solution into a 1:3 mixed solution of diethyl ether and hexane thereby inducing reprecipitation, there was obtained 3.86 g (yield 96.3%) of the captioned block polymer.

EXAMPLE 8

Synthesis of P[(R)-3HB]-PCL by sequential ring-opening copolymerization of (R)-BL and CL In a reaction vessel having an inner volume of 80 ml, 3.44 g (40 mmol) of (R)-BL, 4.0 ml of toluene, and 11.2 mg (0.01 mmol) of 1-ethoxy-3-chlorotetraoctyl distannoxane were placed and stirred at 100° C. for 3 hours under Ar. In the reaction solution, 18.26 g (160 mmol) of CL was added thereto and left reacting for one hour. By dissolving the product of the reaction in chloroform and throwing the resultant solution into a 1:3 mixed solution of diethyl ether and hexane thereby inducing reprecipitation, there was obtained 21.02 g (yield 96.9%) of the captioned block polymer.

EXAMPLE 9

Synthesis of AB type block polyester (hereinafter referred to briefly as "P[(R)-3HB]-PVL") by sequential ring-opening copolymerization of (R)-BL and δ-valerolactone (hereinafter referred to briefly as "VL")

In a reaction vessel having an inner volume of 20 ml, 1.72 g (20 mmol) of (R)-BL, 2.0 ml of toluene, and 5.6 mg (0.005 mmol) of 1-ethoxy-3-chlorotetrabutyl distannoxane were placed and stirred at 100° C. for 3 hours under Ar. In the reaction solution, 2.0 ml of toluene added thereto and 2.00 g (20 mmol) of VL added thereto were left reacting for three hours. By dissolving the product of the reaction in chloroform and throwing the resultant solution into a 1:3 mixed solution of diethyl ether and hexane thereby inducing reprecipitation, there was obtained 3.27 g (yield 87.9%) of the captioned block polymer.

EXAMPLE 10

Synthesis of AB type block polyester (hereinafter referred to briefly as "P[(R)-3HB]-PMVL") by sequential ring-opening copolymerization of (R)-BL and β-methyl-δ-valerolactone (hereinafter referred to briefly as "MVL")

In a reaction vessel having an inner volume of 20 ml, 1.72 g (20 mmol) of (R)-BL, 2.0 ml of toluene, and 5.6 mg (0.005 mmol) of 1-ethoxy-3-chlorotetrabutyl distannoxane were placed and stirred at 100° C. for 3 hours under Ar. In the reaction solution, 2.0 ml of toluene added thereto and 2.28 g (20 mmol) of MVL added thereto immediately thereafter were left reacting for five hours. By dissolving the product of the reaction in chloroform and throwing the resultant solution into a 1:3 mixed solution of diethyl ether and hexane thereby inducing reprecipitation, there was obtained 2.66 g (yield 66.5%) of the captioned block polymer.

EXAMPLE 11

Synthesis of AB type block polyester (hereinafter referred to briefly as "P[(R)-3HB]-P(L-LA)") by sequential ring-opening copolymerization of (R)-BL and L-lactide (hereinafter referred to briefly as "L-LA")

In a reaction vessel having an inner volume of 20 ml, 1.72 g (20 mmol) of (R)-BL, 2.0 ml of toluene, and 5.6 mg (0.005 mmol) of 1-ethoxy-3-chlorotetrabutyl distannoxane were placed and stirred at 100° C. for three hours under Ar. In the reaction solution, a solution of 2.53 g (17.6 mmol) of L-LA in 3.0 ml of toluene was added thereto and left reacting for 20 hours. By dissolving the product of the reaction in chloroform and throwing the resultant solution into a 1:3 mixed solution of diethyl ether and hexane thereby inducing reprecipitation, there was obtained 3.22 g (yield 68.7%) of the captioned block polymer.

EXAMPLE 12

Synthesis of AB type block polyester (hereinafter referred to as "P[(R)-3HB]-P[(R)-MDO]") by sequential ring-opening copolymerization of (R)-BL and (R)-7-methyl-1,4-dioxepan-5-one (hereinafter referred to as "(R)-MDO")

In a reaction vessel having an inner volume of 20 ml, 1.72 g (20 mmol) of (R)-BL, 2.0 ml of toluene, and 11.2 mg (0.01 mmol) of 1-ethoxy-3-chlorotetrabutyl distannoxane were placed and stirred at 100° C. for two hours under Ar. In the reaction solution, a solution of 2.77 g (21.3 mmol) of (R)-MDO in 2.0 ml of toluene was added thereto and left reacting for three hours. By dissolving the product of the reaction in chloroform and throwing the resultant solution into a 1:3 mixed solution of diethyl ether and hexane thereby inducing reprecipitation, there was obtained 4.04 g (yield 90.0%) of the captioned block polymer.

EXAMPLE 13

Synthesis of AB type block polyester (hereinafter referred to as "P[(R)-3HB]-P[(S)-MDO]") by sequential ring-opening copolymerization of (R)-BL and (S)-7-methyl-1,4-dioxepan-5-one (hereinafter referred to briefly as "(S)-MDO")

In a reaction vessel having an inner volume of 20 ml, 1.72 g (20 mmol) of (R)-BL, 2.0 ml of toluene, and 11.2 mg (0.01 mmol) of 1-ethoxy-3-chlorotetrabutyl distannoxane were placed and stirred at 100° C. for 1.5 hours under Ar. In the reaction solution, a solution of 2.58 g (19.8 mmol) of (S)-MDO in 2.0 ml of toluene was added thereto and left reacting for one hour. By dissolving the product of the reaction in chloroform and throwing the resultant solution into a 1:3 mixed solution of diethyl ether and hexane thereby inducing reprecipitation, there was obtained 3.98 g (yield 92.6%) of the captioned block polymer.

EXAMPLE 14

Synthesis of AB type block polyester (hereinafter referred to as "P[(R)-3HB]-P(DMPL)") by sequential ring-opening copolymerization of (R)-BL and α,α-dimethyl-β-propiolactone (hereinafter referred to briefly as "DMPL")

In a reaction vessel having an inner volume of 20 ml, 1.72 g (20 mmol) of (R)-BL, 2.0 ml of toluene, and 11.2 mg (0.01 mmol) of 1-ethoxy-3-chlorotetrabutyl distannoxane were placed and stirred at 100° C. for two hours under Ar. In the reaction solution, 2.0 ml of toluene added thereto and 2.00 g (20 mmol) of DMPL added thereto immediately thereafter were left reacting for 20 hours. By dissolving the product of the reaction in chloroform and throwing the resultant solution into a 1:3 mixed solution of diethyl ether and hexane thereby inducing reprecipitation, there was obtained 1.92 g (yield 51.6%) of the captioned block polymer.

EXAMPLE 15

Synthesis of AB type block Polyester (hereinafter referred to briefly as "P[(RL-3HB]-PHB") by sequential ring-opening copolymerization of (R)-BL and β-butyrolactone (racemiform) (hereinafter referred to briefly as "BL")

In a reaction vessel having an inner volume of 20 ml, 1.72 g (20 mmol) of (R)-BL, 2.0 ml of toluene, and 11.2 mg (0.01 mmol) of 1-ethoxy-3-chlorotetrabutyl distannoxane were placed and stirred at 100° C. for 3.5 hours under Ar. In the reaction solution, 1.72 g (20 mmol) of BL was added thereto and left reacting for three hours. By dissolving the product of the reaction in chloroform and throwing the resultant solution into a 1:3 mixed solution of diethyl ether and hexane thereby inducing reprecipitation, there was obtained 2.61 g (yield 75.9%) of the captioned block polymer.

EXAMPLE 16

Synthesis of AB type block polyester (hereinafter referred to briefly as "P[(R)-3HB]-P[(S)-3HB]") by sequential ring-opening copolymerization of (R)-BL and (S)-β-butyrolactone (hereinafter referred to briefly as "(S)-BL")

In a reaction vessel having an inner volume of 20 ml, 1.72 g (20 mmol) of (R)-BL, 2.0 ml of toluene, and 11.2 mg (0.01 mmol) of 1-ethoxy-3-chlorotetrabutyl distannoxane were placed and stirred at 100° C. for 2.5 hours under Ar. In the reaction solution, 1.72 g (20 mmol) of (S)-BL was added thereto and left reacting for four hours. By dissolving the product of the reaction in chloroform and throwing the resultant solution into a 1:3 mixed solution of diethyl ether and hexane thereby inducing reprecipitation, there was obtained 2.71 g (yield 78.8%) of the captioned block polymer.

EXAMPLE 17

Synthesis of AB type block polyester (hereinafter referred to briefly as "P[(R)-3HB]-PGL") by sequential ring-opening copolymerization of (R)-BL and glycolide (hereinafter referred to briefly as "GL")

In a reaction vessel having an inner volume of 20 ml, 1.72 g (20 mmol) of (R)-BL, 2.0 ml of toluene, and 11.2 mg (0.01 mmol) of 1-ethoxy-3-chlorotetrabutyl distannoxane were placed and stirred at 100° C. for 3.5 hours under Ar. In the reaction solution, a solution of 2.23 g (19.2 mmol) of GL in 5.0 ml of dichloroethane was added thereto and left reacting for one hour. By subjecting the product of the reaction in a solid state to desiccation under a reduced pressure, there was obtained 3.94 g (yield 99.7%) of the captioned block polymer.

EXAMPLE 18

Synthesis of ABA type block polyester (hereinafter referred to briefly as "P[(R)-3HB]-PCL-P[(R)-3HB]") by sequential ring-opening copolymerization of (R)-BL and CL In a reaction vessel having an inner volume of 30 ml, 1.72 g (20 mmol) of (R)-BL, 0.5 ml of toluene, and 22.5 mg (0.02 mmol) of 1-ethoxy-3-chlorotetrabutyl distannoxane were placed and stirred at 100° C. for one hour under Ar. In the reaction solution, 0.5 ml of toluene and 2.28 g (20.0 mmol) of CL were added and left reacting for six minutes and further 1.0 ml of toluene and 1.72 g (20.0 mol) of (R)BL were added and left reacting for three hours. By dissolving the product of the reaction in chloroform and throwing the resultant solution into a 1:3 mixed solution of diethyl ether and hexane thereby inducing reprecipitation, there was obtained 4.97 g (yield 87.0%) of the captioned block polymer.

EXAMPLE 19

Synthesis of ABA type block polyester (hereinafter referred to as "P[(R)-3HB]-P[(R)-MDO]-P [(R)-3HB]") by sequential ring-opening copolymerization of (R)-BL and (R)-MDO In a reaction vessel having an inner volume of 30 ml, 1.57 g (18.2 mmol) of (R)-BL, 0.5 ml of toluene, and 22.5 mg (0.02 mmol) of 1-ethoxy-3-chlorotetrabutyl distannoxane were placed and stirred at 100 for 1.5 hours under Ar. In the reaction solution, 1.0 ml of toluene and 3.30 g (25.8 mmol) of (R)-MDO were added and left reacting for 20 minutes and further 1.25 g (14.5 mmol) of (R)-BL was added thereto and left reacting for 2.5 hours. By dissolving the product of the reaction in chloroform and throwing the resultant solution into a 1:3 mixed solution of diethyl ether and hexane thereby inducing reprecipitation, there was obtained 4.75 g (yield 77.6%) of the captioned block polymer.

EXAMPLE 20

Synthesis of AB type block polyester (hereinafter referred to briefly as "P[(R)-3HB]-P(15PD)") by sequential ring-opening copolymerization of (R)-BL and 15-pentadecanolide (hereinafter referred to briefly as "15-PD")

In a reaction vessel having an inner volume of 80 ml, 3.44 g (40 mmol) of (R)-BL and 22.5 mg (0.02 mmol) of 1-ethoxy-3-chlorotetrabutyl distannoxane were placed and stirred at 100° C. for 50 minutes under Ar. In the reaction solution, 4.0 ml of toluene was added and stirred for 2.5 hours and a solution of 7.27 g (30.2 mmol) of 15-PD in 4.0 ml of toluene was added and left reacting for 8 hours. By dissolving the product of the reaction in chloroform and throwing the resultant solution into a 1:3 mixed solution of diethyl ether and hexane thereby inducing reprecipitation, there was obtained 7.38 g (yield 68.9%) of the captioned block polymer.

EXAMPLE 21

Synthesis of AB type block polyester (hereinafter referred to briefly as "P[(R)-3HB]-P(11-O-16-HD)") by sequential ring-opening copolymerization of (R)-BL and 11-oxa-16-hexadecanolide (hereinafter referred to briefly as "11-O-16-HD")

In a reaction vessel having an inner volume of 80 ml, 3.44 g (40 mmol) of (R)-BL and 22.5 mg (0.02 mmol) of 1-ethoxy-3-chlorotetrabutyl distannoxane were placed and stirred at 100° C. for 50 minutes under Ar. In the reaction solution, 4.0 ml of toluene was added and stirred for 1.5 hours and a solution of 5.07 g (19.8 mmol) of 11-O-16-HD in 2.0 ml of toluene was added and left reacting for 19 hours. By dissolving the product of the reaction in chloroform and throwing the resultant solution into methanol thereby inducing reprecipitation, there was obtained 5.77 g (yield 67.8%) of the captioned block polymer.

Comparative Example 1

Synthesis of P[(R)-3HB]-PCL from microorganically produced P[(R)-3HB] and CL

In a reaction vessel having an inner volume of 200 ml, 6.0 g of microorganically produced P[(R)-3HB], 8.0 g (70.1 mmol) of CL, 0.1 g (1.04 mmol) of methanesulfonic acid, and 70 ml of 1,2-dichloroethane were placed and refluxed and stirred for 6.5 hours under Ar. By throwing the resultant reaction mixture in 300 ml of methanol thereby inducing reprecipitation, there was obtained 11.2 g (yield 80.1) of the captioned copolymer.

Figure 2:
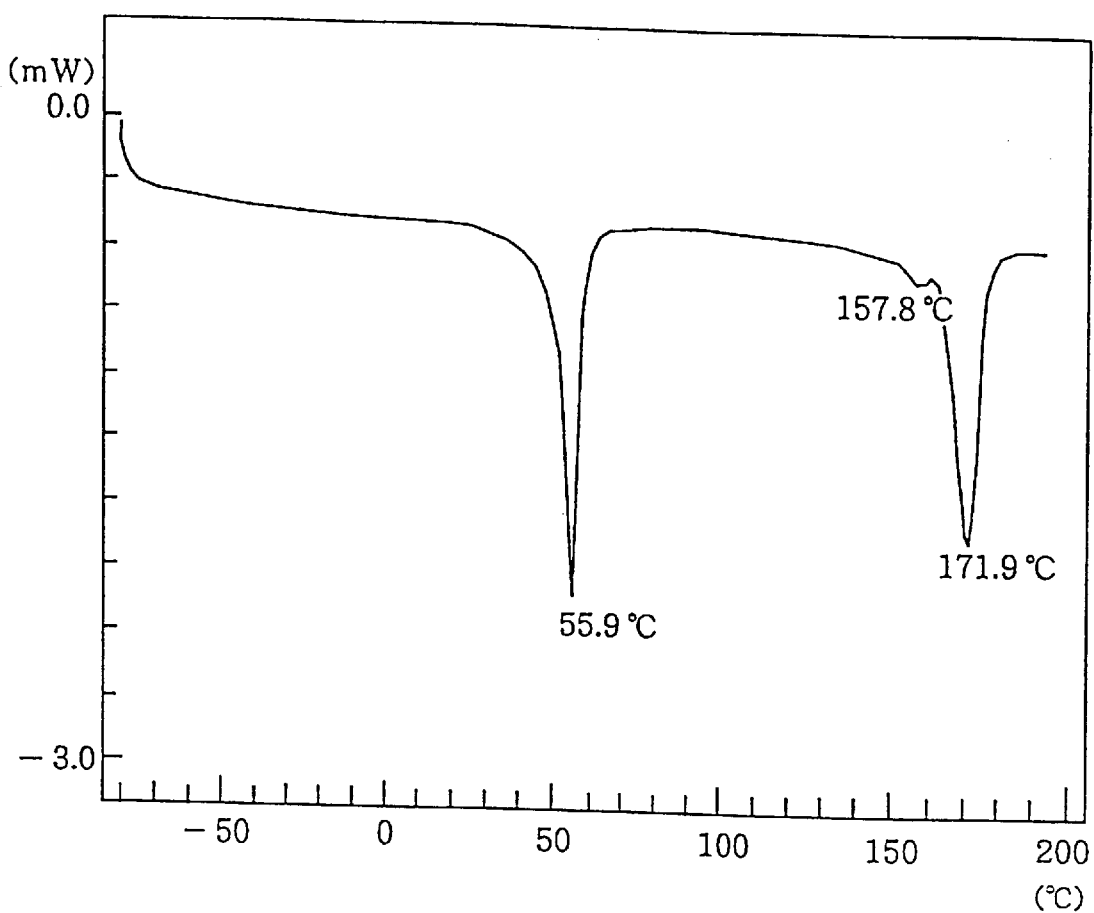
FIG. 2 is a graph showing the DSC (thermal analysis) data obtained of the polymer produced in Comparative Example 1.
Figure 3:
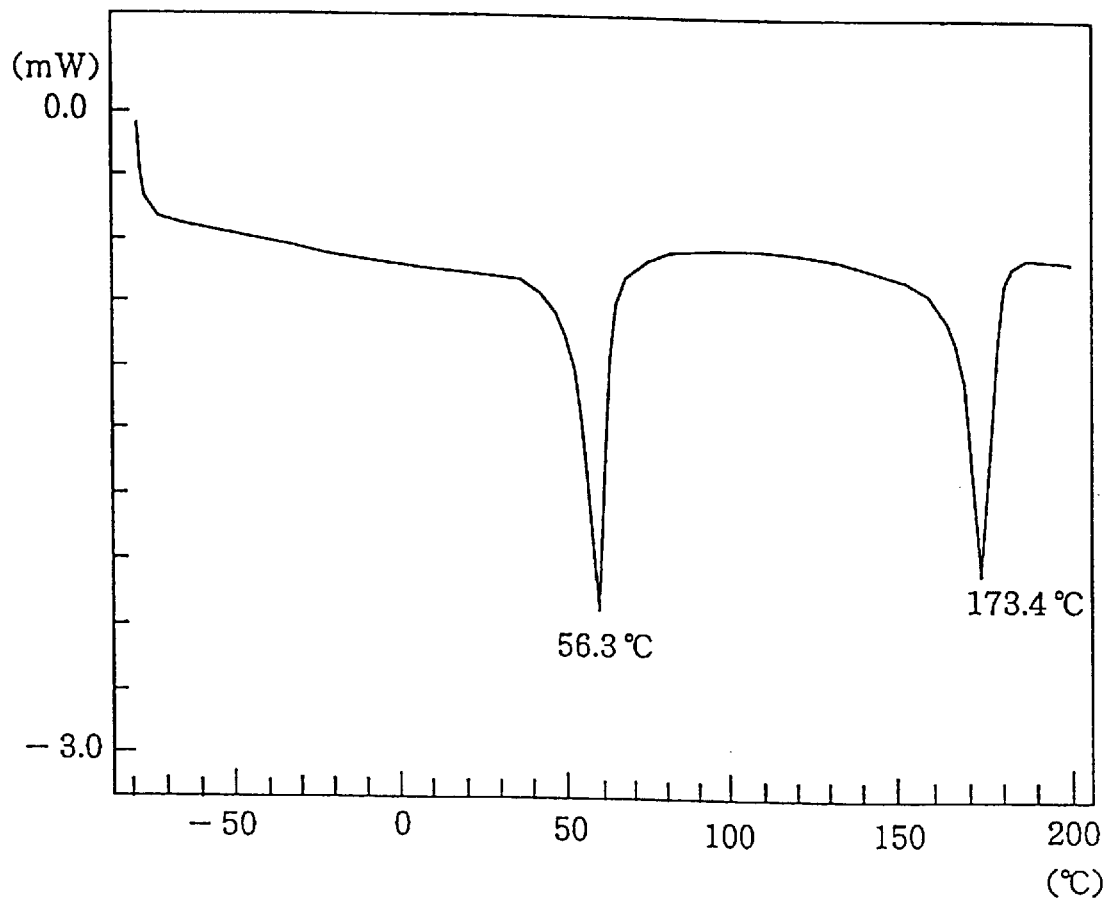
FIG. 3 is a graph showing the DSC (thermal analysis) data obtained of the mere blend of synthetic P[(R)3HB] with PCL.
Figure 4:
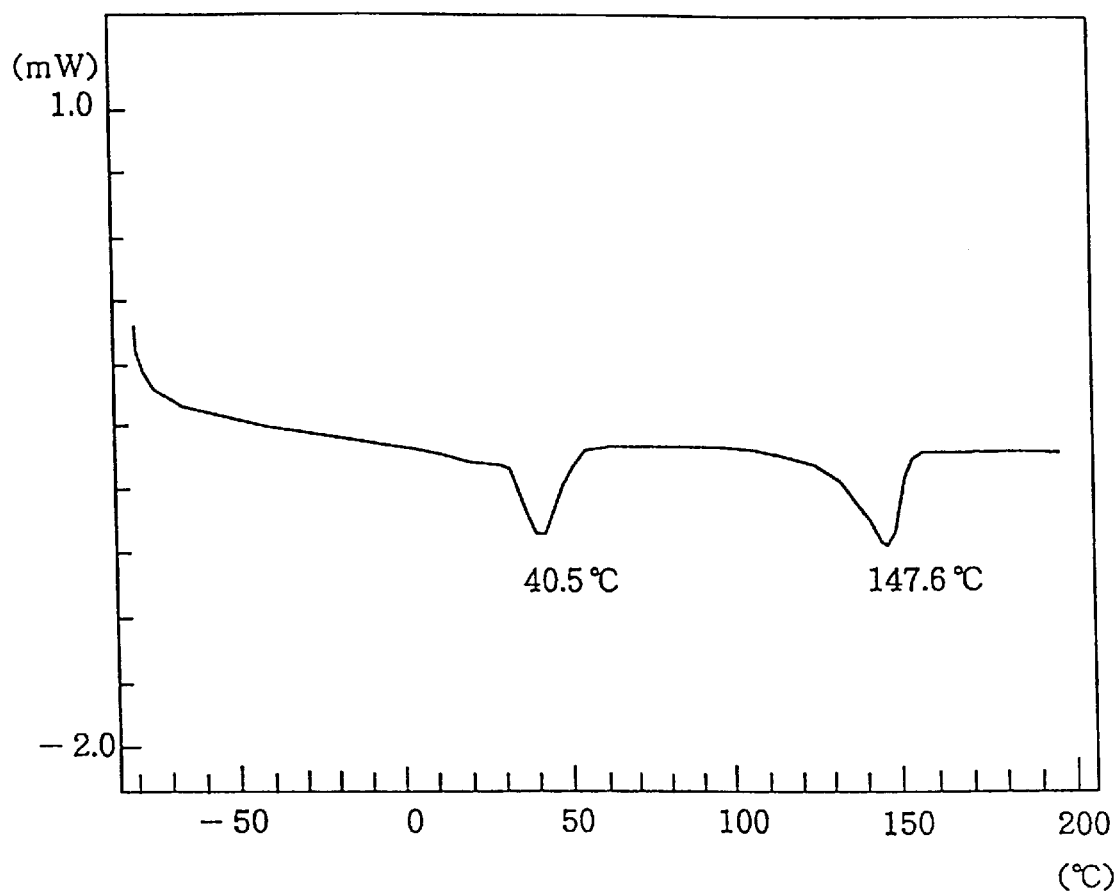
FIG. 4 is a graph showing the DSC (thermal analysis) data obtained of the P[(R)-3HB] PCL block polyester produced in Example 1.

The data of DSC (thermal analysis) of the copolymer obtained in Comparative Example 1 are shown in FIG. 2. The DSC data obtained of a mere blend of synthetic P[(R)-3HB] and PCL are shown in FIG. 3 and the DSC data obtained of the P[(R)-3HB]-PCL block polyester produced in Example 1 are shown in FIG. 4. By comparing these diagrams, it is remarked that the data of FIG. 2 and those of FIG. 3 bear a striking resemblance and those of FIG. 2 and FIG. 4 are appreciably different. From this fact, it is inferred that such a process of production as is disclosed in JP-A-04-153,215 does not produce a block polyester copolymer of P[(R)-3HB]-PCL but produces a mere blend of P[(R)-3HB] with PCL.

Comparative Example 2

Synthesis of P(3HB)-PCL by sequential ring-opening copolymerization of BL and CL In a reaction vessel having an inner volume of 30 ml, 3.53 g (41 mmol) of BL and 12.0 mg (0.01 mmol) of 1-ethoxy-3-chlorotetrabutyl distannoxane were placed and stirred at 100° C. for 1.5 hours under Ar. In the reaction solution, 0.5 ml of toluene added thereto and 5.30 g (46 mmol) of CL added thereto immediately thereafter were left reacting for one hour. By dissolving the product of the reaction in chloroform and throwing the resultant solution into a 1:3 mixed solution of diethyl ether and hexane thereby inducing reprecipitation, there was obtained 7.61 g (yield 86.2%) of the captioned block polymer.

Test Example 1

Test of polymer of Example 1 for biodegradability

A total, 17 to 25 mg, of thin films, 1 cm×1 cm in area and 0.05 to 0.1 mm in thickness, of the polymer obtained in Example 1 (produced by dissolving the polymer in chloroform, casting the solution as in a petri dish, and expelling the solvent by evaporation and leaving behind a film) were placed in a flask and tested for biodegradability by the use of a shaken constant temperature water bath (produced by Tytech K.K.)under the conditions of 500 ppm (600 ml) of activated sludge, pH 6.0 to 7.0, and 25.

The thin films of polymer were weighed after the elapse of one week, two weeks, three weeks, and four weeks to find decreases of weight. The results are shown in FIG. 1. From the results, it is clearly noted that the polymer films obtained in Example 1 showed a decrease of 1.29 mg of weight after four weeks' standing.

Test Example 2

Test of polymer of Example 5 for biodegradability

The polymer obtained in Example 5 was tested for biodegradability by following the procedure of Test Example 1. The results are shown in FIG. 1. The polymer films showed a decrease of 1.34 mg of weight after four weeks' standing.

Test Example 3

Test of polymer of Example 6 for biodegradability

The polymer obtained in Example 6 was tested for biodegradability by following the procedure of Test Example 1. The results are shown in FIG. 1. The polymer films showed a decrease of 4.28 mg of weight after four weeks' standing.

Test Example 4

Test of polymer of Example 9 for biodegradability

The polymer obtained in Example 9 was tested for biodegradability by following the procedure of Test Example 1. The results are shown in FIG. 1. The polymer films showed a decrease of 9.74 mg of weight after four weeks' standing.

Test Example 5

Test of polymer of Example 10 for biodegradability

The polymer obtained in Example 10 was tested for biodegradability by following the procedure of Test Example 1. The results are shown in FIG. 1. The polymer films showed a decrease of 4.03 mg of weight after four weeks' standing.

Test Example 6

Test of polymer of Example 11 for biodegradability

The polymer obtained in Example 11 was tested for biodegradability by following the procedure of Test Example 1. The results are shown in FIG. 1. The polymer films showed a decrease of 0.92 mg of weight after four weeks' standing.

Test Example 7

Test of polymer of Example 13 for biodegradability

The polymer obtained in Example 13 was tested for biodegradability by following the procedure of Test Example 1. The results are shown in FIG. 1. The polymer films showed a decrease of 4.95 mg of weight after four weeks' standing.

Test Example 8

Test of polymer of Example 15 for biodegradability

The polymer obtained in Example 15 was tested for biodegradability by following the procedure of Test Example 1. The results are shown in FIG. 1. The polymer films showed a decrease of 6.13 mg of weight after four weeks' standing.

The optically active block copolymer polyester of this invention is produced by subjecting an optically active butyrolactone and a lactone other than the optically active butyrolactone to ring-opening polymerization in the presence of a highly active catalyst as described above. Thus, it constitutes itself a biodegradable and hydrolyzable material possessing a high molecular weight and a high melting point and exhibiting high strength capable of withstanding the impacts incurred in actual use. This invention provides clean plastic materials which avoid polluting the environment. Particularly, since the present invention allows easy production of biodegradable and hydrolyzable polyesters having melting points of not less than 130° C., it has opened up utility in new applications as materials for films capable of withstanding the temperature of hot water and that of an electronic range, surface films on paper cups, laminate materials, plasticizers for biodegradable polyesters, and agents for imparting compatibility in addition to the applications as fishing lines, fishing nets, sheets for agricultural structures, wrapping films, medical materials, etc. Further, the polymers according to this invention possess bioadaptability and succumb to in vivo hydrolysis and absorption and, therefore, find utility as such medical materials as surgical sutures and clips which need not be removed after use. Particularly, the block copolymer polyesters which are obtained by using a distannoxane catalyst of the general formula (III) having an alkyl group of 8 to 12 carbon atoms enjoy high safety and proves particularly useful for medical materials.

TABLE 1

| | Charging ratio | Monomer content ratio | Mw | Mn | Tg (°C.)* | Tm (°C.) | Td (°C.) | $[\alpha]_D^{23}$ (C) = 1 |
|---|---|---|---|---|---|---|---|---|
| Example 1 | (R)-BL/CL 50/50 | 50/50 | 251000 | 162000 | −57 | 41.148 | 293.381 | −0.88 |
| Example 2 | (R)-BL/CL 50/50 | 51/49 | 250000 | 150000 | −59 | 35.156 | 275.380 | −0.88 |
| Example 3 | (R)-BL/CL 50/50 | 50/50 | 248000 | 143000 | −57 | 38.151 | 283 | −0.83 |
| Example 4 | (R)-BL/CL 50/50 | 50/50 | 241000 | 138000 | −58 | 39.153 | 282 | −0.87 |
| Example 5 | (R)-BL/CL 33/67 | 29/71 | 422000 | 233000 | −55 | 47.145 | 268.380 | −1.08 |
| Example 6 | (R)-BL/CL 67/33 | 60/40 | 259000 | 161000 | −39 | 31.150 | 293 | −1.88 |
| Example 7 | (R)-BL/CL 50/50 | 50/50 | 245000 | 140000 | −58 | 39.152 | 283 | −0.85 |
| Example 8 | (R)-BL/CL 20/80 | 19/81 | 1180000 | 470000 | −55 | 55.151 | 381 | −0.60 |
| Example 9 | (R)-BL/VL 50/50 | 51/49 | 362000 | 222000 | −50 | 135 | 284 | −1.28 |
| Example 10 | (R)-BL/MVL 50/50 | 66/34 | 273000 | 151000 | −35 | 143 | 282 | −1.74 |
| Example 11 | (R)-BL/L-LA 53/47 | 51/49 | 160000 | 126000 | −13.27 | 143.158 | 275 | −86.3 |
| Example 12 | (R)-BL/(R)-MDO 48/52 | 49/51 | 185000 | 120000 | −34 | 133 | 286 | −17.0 |
| Example 13 | (R)-BL/(S)-MDO 50/50 | 50/50 | 196000 | 127000 | −34 | 142 | 280 | +15.7 |
| Example 14 | (R)-BL/ααDMPL 50/50 | 85/15 | 171000 | 116000 | — | 143 | 284 | −2.89 |
| Example 15 | (R)-BL/BL 50/50 | — | 219000 | 115000 | 5 | 72.152 | 250 | −0.78 |
| Example 16 | (R)-BL/(S)-BL 50/50 | — | 213000 | 141000 | 2 | 149 | 287 | +0.03 |
| Example 17 | (R)-BL/GL 51/49 | — | — | — | — | 147.222 | 288 | — |
| Example 18 | (R)-BL/CL/(R)-BL 10/10/10 | 10/10/2 | 180000 | 120000 | — | 35.167 | 275 | −1.57 |
| Example 19 | (R)-BL/(R)-MDO/(R)-BL 31/44/25 | 38/48/14 | 128000 | 64000 | −29 | 155 | 285 | −16.5 |
| Example 20 | (R)-BL/15-PD 57/43 | 61/39 | 228000 | 140000 | — | 72.154 | 288 | −1.50 |
| Example 21 | (R)-BL/11-O-16-HD 67/33 | 78/22 | 119000 | 77000 | — | 41.159 | 285 | −1.80 |
| Comparative Example 1 | P[(R)/3HB]/CL 6.0 g/8.0 g | 54/46 | 87000 | 35000 | — | 56.172 | 292.344 | — |
| Comparative Example 2 | BL/CL 47/53 | 42/58 | 380000 | 170000 | −36 | 33 | 280.378 | — |

*The symbol "—" in the column titled "Tg (°C.) designates the absence of a discernible peak in the curve.

While the invention has been described in detail and with reference to specific embodiments thereof, it will be apparent to one skilled in the art that various changes and modifications can be made therein without departing from the spirit and scope thereof.

What is claimed is:

1. An optically active diblock polyester copolymer or active triblock polyester copolymer consisting essentially of a diblock copolymer or triblock copolymer of structural formula (I)–(II), (II)–(I), (I)–(II)–(I) or (I)–(II)–(X), wherein (I) and (II) are represented by the following general formulas:

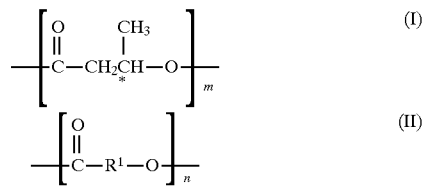

wherein $\overset{C}{*}$ represents an asymmetric carbon atom, $R^1$ represents a member selected from the group consisting of —$(CH_2)_x$—, —$CH_2CH(CH_3)$—, —$CH_2CH(CH_5)$—, —$CH(CH_3)CH(CH_3)$—, —$C(CH_3)_2CH_2$—, —$CH(CH_3)CH_2CH_2$—, —$CH_2CH(CH_3)CH_2$—, —$CH_2CH_2CH(CH_3)$—, —$CH_2CH(CH_3)CH_2CH_2$—, —$CH(CH_3)OCOCH(CH_3)$—, —$CH_2OCOCH_2$—, —$CH_2CH(CH_3)OCH_2CH_2$—, —$(CH_2)_7CH=CH(CH_2)6$—, —$(CH_2)_{10}O(CH_2)_4$—, —$(CH_2)_9O(CH_2)_5$— and —$(CH_2)_8O(CH_2)_6$—, x represents a natural number in the range of from 2 to 15, and m and n each represents a natural number in the range of from 300 to 5,000;

and (X) is a lactone group.

2. The optically active diblock polyester copolymer or active triblock polyester copolymer according to claim 1, wherein said structural unit (I) and said structural unit (II) are present in a range of 10–90:90–10 by mole and said polyester has a molecular weight of 60,000 to 2,000,000.

3. A method for the production of the optically active diblock polyester copolymer or active triblock polyester copolymer set forth in claim 1, comprising subjecting an optically active butyrolactone and a species of lactone other than said optically active butyrolactone to sequential ring-opening copolymerization in the presence of a tin containing catalyst.

4. An optically active triblock polyester copolymer consisting essentially of a or triblock copolymer of structural formula (II)–(I)–(I) or (II)–(I)–(X), wherein (I) and (II) are represented by the following general formulas:

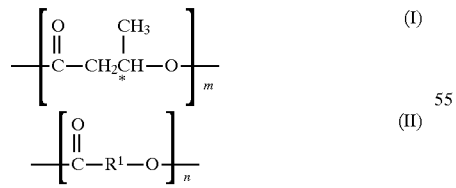

wherein $\overset{C}{*}$ represents an asymmetric carbon atom, $R^1$ represents a member selected from the group consisting of —$(CH_2)_x$—, —$CH_2CH(CH_3)$—, —$CH_2CH(C_2H_5)$—, —$CH(CH_3)CH(CH_3)$—, —$C(CH_3)_2CH_2$—, —$CH(CH_3)CH_2CH_2$—, —$CH_2CH(CH_3)CH_2$—, —$CH_2CH_2CH(CH_3)$—, —$CH_2CH(CH_3)CH_2CH_2$—, —$CH(CH_3)OCOCH(CH_3)$—, —$CH_2OCOCH_2$—, —$CH_2CH(CH_3)OCH_2CH_2$—, —$(CH_2)_7CH=CH(CH_2)6$—, —$(CH_2)_{10}O(CH_2)_4$—, —$(CH_2)_9O(CH_2)_5$— and —$(CH_2)_8O(CH_2)_6$—, x represents a natural number in the range of from 2 to 15, and m and n each represents a natural number in the range of from 300 to 5,000;

and (X) is a lactone group.

5. The optically active triblock polyester copolymer according to claim 4, wherein said structural unit (I) and said structural unit (II) are present in a range of 10–90:90–10 by mole and said polyester has a molecular weight of 60,000 to 2,000,000.

6. A method for the production of the optically active triblock polyester copolymer set forth in claim 4, comprising subjecting an optically active butyrolactone and a species of lactone other than said optically active butyrolactone to sequential ring-opening copolymerization in the presence of a tin containing catalyst.

7. A method for the production of an optically active diblock polyester copolymer or active triblock polyester copolymer formed of structural units represented by the following general formulas (I) and (II):

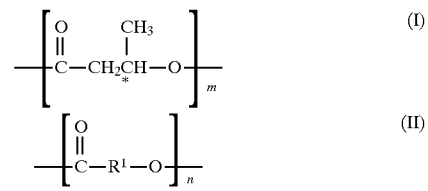

wherein $\overset{C}{*}$ represents an asymmetric carbon atom, $R^1$ represents a member selected from the group consisting of —$(CH_2)_2$—, —$CH_2CH(CH_3)$—, —$CH_2CH(C_2H_5)$—, —$CH(CH_3)CH(CH_3)$—, —$C(CH_3)_2CH_2$—, —$CH(CH_3)CH_2CH_2$—, —$CH_2CH(CH_3)CH_2$—, —$CH_2CH_2CH(CH_3)$—, —$CH_2CH(CH_3)CH_2CH_2$—, —$CH(CH_3)OCOCH(CH_3)$—, —$CH_2OCOCH_2$—, —$CH_2CH(CH_3)OCH_2CH_2$—, —$(CH_2)_7CH=CH(CH_2)6$—, —$(CH_2)_{10}O(CH_2)_4$—, —$(CH_2)_9O(CH_2)_5$— and —$(CH_2)_8O(CH_2)_6$—, x represents a natural number in the range of from 2 to 15, and m and n each represents a natural number in the range of from 300 to 5,000;

comprising subjecting an optically active butyrolactone and a species of lactone other than said optically active butyrolactone to sequential ring-opening copolymerization in the presence of a tin containing catalyst.

8. The method according to claim 7, wherein said catalyst is a distannoxane catalyst represented by the following general formula (III):

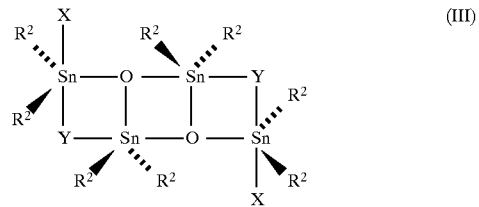

wherein $R^2$ represents an alkyl group having from one to 12 carbon atoms or a phenyl group, X represents a member selected from the group consisting of Cl, Br, and NCS, and Y represents a member selected from the group consisting of Cl, Br, NCS, OH, an alkoxy group having from one to four carbon atoms, and a phenoxy group.

* * * * *